(12) United States Patent
Hotaling

(10) Patent No.: US 7,124,568 B2
(45) Date of Patent: Oct. 24, 2006

(54) ADJUSTABLE ROTOR STRIPPER MOUNT FOR A ROUND BALER

(75) Inventor: William D. Hotaling, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/855,267

(22) Filed: May 27, 2004

(65) Prior Publication Data

US 2005/0262822 A1    Dec. 1, 2005

(51) Int. Cl.
*A01D 43/02* (2006.01)
*B30B 9/00* (2006.01)

(52) U.S. Cl. .......................................... 56/341; 100/88
(58) Field of Classification Search ................ 56/14.4, 56/220, 341, 400.02; 100/88, 89
See application file for complete search history.

(56) References Cited

U.S. PATENT DOCUMENTS

| | | | | |
|---|---|---|---|---|
| 2,378,107 A | * | 6/1945 | Russell | 56/364 |
| 2,490,143 A | * | 12/1949 | Magee | 56/351 |
| 2,682,743 A | * | 7/1954 | Hintz | 56/364 |
| 3,226,921 A | | 1/1966 | Shepley | 56/364 |
| 3,295,302 A | * | 1/1967 | Lee | 56/364 |
| 3,513,651 A | * | 5/1970 | Hollyday et al. | 56/343 |
| 3,924,391 A | | 12/1975 | Cheatum | 56/364 |
| 4,161,859 A | | 7/1979 | Storm et al. | 56/364 |
| 4,290,259 A | | 9/1981 | Parvin et al. | 56/364 |
| 4,436,027 A | | 3/1984 | Freimuth et al. | 100/88 |
| 4,446,684 A | * | 5/1984 | Frimml et al. | 56/341 |
| 4,524,576 A | * | 6/1985 | Probst | 56/372 |
| 4,581,879 A | | 4/1986 | Anstey | 56/341 |
| 4,648,239 A | | 3/1987 | Geiser et al. | 56/341 |
| 4,788,900 A | | 12/1988 | Berkers | 100/88 |
| 5,519,990 A | * | 5/1996 | Rodewald et al. | 56/341 |
| 5,551,221 A | | 9/1996 | Sund | 56/400 |
| 5,595,055 A | | 1/1997 | Horchler, Jr. et al. | 56/341 |
| 6,050,075 A | | 4/2000 | Waldrop | 56/364 |
| 6,314,709 B1 | | 11/2001 | McClure et al. | 56/364 |
| 6,526,736 B1 | | 3/2003 | Anstey | 56/341 |
| 6,681,552 B1 | | 1/2004 | Nelson et al. | 56/11.2 |

* cited by examiner

*Primary Examiner*—Thomas B. Will
*Assistant Examiner*—Alicia Torres
(74) *Attorney, Agent, or Firm*—Stephen A. Bucchianeri; John William Stader; Michael G. Harms

(57) ABSTRACT

A rotor stripper mount pivotably fixed at its ends to the rotor frame of a round baler for arcuate fore-and-aft movement selectively fixable to the rotor frame. The arcuate fore-and-aft movement alters the distal relationship between the stripper channels and the rotor fingers and surfaces.

9 Claims, 6 Drawing Sheets

ADJUSTABLE ROTOR STRIPPER MOUNT FOR A ROUND BALER

BACKGROUND OF THE INVENTION

The present invention relates generally to an improved agricultural round baler of the type employing a rotor for assisting the baling process, and particularly to such a baler with an adjustable rotor stripper mount.

For several years agricultural round balers have been used to consolidate and package crop material so as to facilitate the storage and handling of the crop material for later use. Usually, a mower-conditioner cuts and conditions the crop material for windrow drying in the sun. When the cut crop material is properly dried, a baler, most likely a round baler, is pulled along the windrows to pick up the crop material and form it into cylindrically-shaped round bales. More specifically, the pickup of the baler gathers the cut and windrowed crop material from the ground. The pickup assembly then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is, itself, known in the prior art, as shown, for example, in U.S. Pat. Nos. 5,595,055 and 6,644,006. The rotor mechanism usually takes one of two forms . . . a cutter or a feeder, both of which forms also convey crop material as described above. An elongate shaft or tube has a plurality of fingers pivotably affixed spirally along the length thereof that move into and out of the path between the pickup and bale-forming chamber as the shaft or tube is rotated. The fingers thus engage the crop material and convey the crop material within a transverse opening toward and into the bale-forming chamber. When the rotor floor has a series of elongated slots, a knife carriage fixed to the side sheets may be used. The knives, having a cutting and registration surface, are pushed up through the floor into the crop path between the rotor fingers. This mechanism is referred to as a "cutter"; however, without the cutting edge, it is called a "feeder". The cutter is better in certain crop conditions, i.e., where the customer desires his crop to be more finely chopped in the bale.

Structurally, the rotor conveyor is rotatably mounted in its own frame, which is, in turn, mounted to the baler between the pickup and the bale-forming chamber. A plurality of stripper channels are affixed to a transverse stripper mount which is rigidly affixed at its ends to the rotor frame, as by welding, and spaced therealong between each of the openings between the fingers, forming a table-like arrangement such that as the fingers rotate to convey the crop material through the transverse opening, the crop material engages the stripper channels and the fingers are substantially wiped clean.

A troublesome problem presented with a fixed stripper mount, i.e., not adjustable, is that damage may occur to the stripper mount and or stripper channels due to poor clearance between or among the various components. It would be a great advantage to have an adjustable bolt-in stripper mount that can easily be replaced and/or adjusted relative to the rotor fingers.

SUMMARY OF THE INVENTION

Accordingly, it is an object of the present invention is to provide an adjustable rotor stripper mount a round baler that overcomes the problems identified above.

Another object of the present invention is to provide a bolt-in adjustable rotor stripper mount for a round baler.

It is another object of the instant invention to provide a rotor stripper mount that uses slotted bolt mounts to allow fore-and-aft pivotable adjustment of the rotor stripper mount to the rotor frame.

It is another object of the instant invention to provide a rotor stripper mount adjustably fixed to the rotor frame at both ends for selective pivotable fore-and-aft movement to allow selective pivotal movement of the stripper channels relative to the crop-engaging fingers.

It is another object of the instant invention to provide a rotor stripper mount pivotably fixed at its ends to the rotor frame for arcuate fore-and-aft movement selectively fixable to the rotor frame.

It is yet another object of this invention to provide an improved rotor stripper mount for a round baler that is durable in construction, inexpensive of manufacture, carefree of maintenance, facile in assemblage, and simple, versatile and effective in use.

These and other objects are attained by providing a rotor stripper mount pivotably fixed at its ends to the rotor frame of a round baler for arcuate fore-and-aft movement selectively fixable to the rotor frame. The arcuate fore-and-aft movement alters the distal relationship between the stripper channels and the rotor fingers and surfaces.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
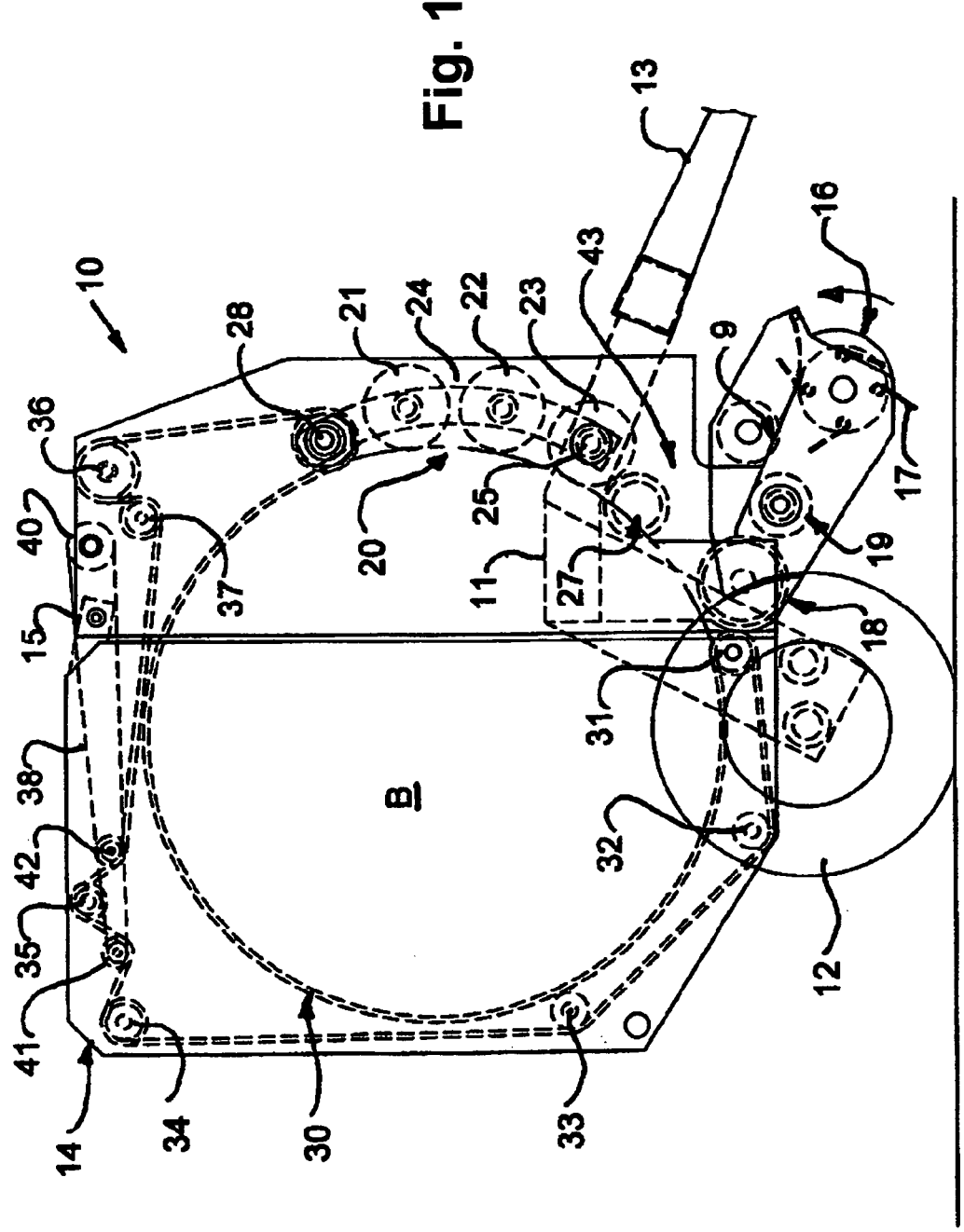
FIG. 1 is a side elevational view of a round baler in which the present invention may be used.

Referring now to the drawings for a more detailed description of the preferred embodiment of the invention, FIG. 1 shows an expandable chamber round baler 10 of the general type disclosed in U.S. Pat. No. 4,956,968 ("the '968 patent") issued on Sep. 18, 1990 in the name of Kenneth R. Underhill. Baler 10 includes a main frame 11 supported by a pair of wheels 12 (only one shown), a tongue 13 on the forward portion of main frame 11 for connection to a tractor, and a tailgate 14 pivotally connected to main frame 11 by stub shafts 15 so that tailgate 14 may be closed as shown in FIG. 1 during bale formation and wrapping or opened to discharge a completed bale. Pickup apparatus, generally comprising a pickup 16 and a feeder 19, is mounted on main frame 11.

Pickup 16 includes a plurality of tines 17 movable along a predetermined path to lift crop material from the ground and deliver it along feed table 9 toward a floor roll 18 which is rotatably mounted on main frame 11. Opposing augers (not shown) mounted rearwardly of pickup 16, are operatively associated with feeder 19 as discussed below.

The baler depicted in FIG. 1 further shows a sledge assembly 20 having a plurality of rollers 21, 22 and 23 extending transversely of main frame 11 in an arcuate array common to the type of baler described in the '968 patent, mentioned above.

Rollers 21, 22, and 23 are journalled at the ends thereof in a pair of spaced apart arms 24 (only one shown) pivotally mounted between the two sidewalls of main frame 11 on stub shafts 25 for permitting pivotal movement of the sledge between a bale starting position (shown in the '968 patent) and the full bale position shown in FIG. 1. Rollers 21, 22 and 23 are driven in a counter clockwise direction, as viewed in FIG. 1, by conventional means connected to a power take-off of a tractor (also not shown). A starter roll 27 is located adjacent roller 23 and is also driven in a counter clockwise direction to strip crop material from roller 23. A freely rotatable idler roller 28 is also mounted on arms 24 for movement with sledge assembly 20.

An apron, generally referred to by reference numeral 30, includes a plurality of continuous flat side by side belts supported by guide rolls 31, 32, 33, 34 and 35 rotatably mounted in tailgate 14. Apron 30 is also supported on a drive roll 36 rotatably mounted on main frame 11. Although apron 30 passes between roller 21 and idler roller 28, it is only in engagement with idler roller 28. Roller 21 is located in close proximity to apron 30 to strip crop material from its belts. Conventional means (not shown) provide rotation of drive roll 36 in a direction causing movement of apron 30 along the path indicated in broken lines in FIG. 1. An additional guide roll 37 in main frame 11 ensures proper driving engagement between apron 30 and drive roll 36. A pair of take up arms 38 (one shown) are pivotally mounted on main frame 11 by a cross shaft 40 for movement between varying inner and fixed outer positions, corresponding to bale-forming and full bale conditions, respectively. The full bale position shown in FIG. 1 will suffice for the purposes of the description of this invention. Further, it should be noted that take up arms 38 carry additional guide rolls 41, 42 for supporting apron 30. Resilient means (not shown) are provided to normally urge take up arms 38 toward their inner positions while resisting movement thereof from their inner positions to their outer positions to keep tension on the roll-forming belts in a known manner.

As baler 10 is towed across a field by a tractor, pickup tines 17 lift crop material, usually in a windrow, from the ground and deliver it to augers which converge the material and urge it to feed table 9 where feeder 19 engages the material and feeds it rearwardly into the bale-forming chamber through transverse infeed opening 43, commonly referred to as the throat, which in the baler shown is defined by floor roll 18 and starter roll 27. The crop material fed through throat 43 is continuously coiled in a clockwise direction until the inner courses of apron 30 expand to the position shown in FIG. 1. This formation of a cylindrical package takes place in a well known manner, after which the package is wrapped, tailgate 14 is opened, the bale B is discharged rearwardly, tailgate 14 is closed and the baler is again ready to form another bale.

Figure 2:
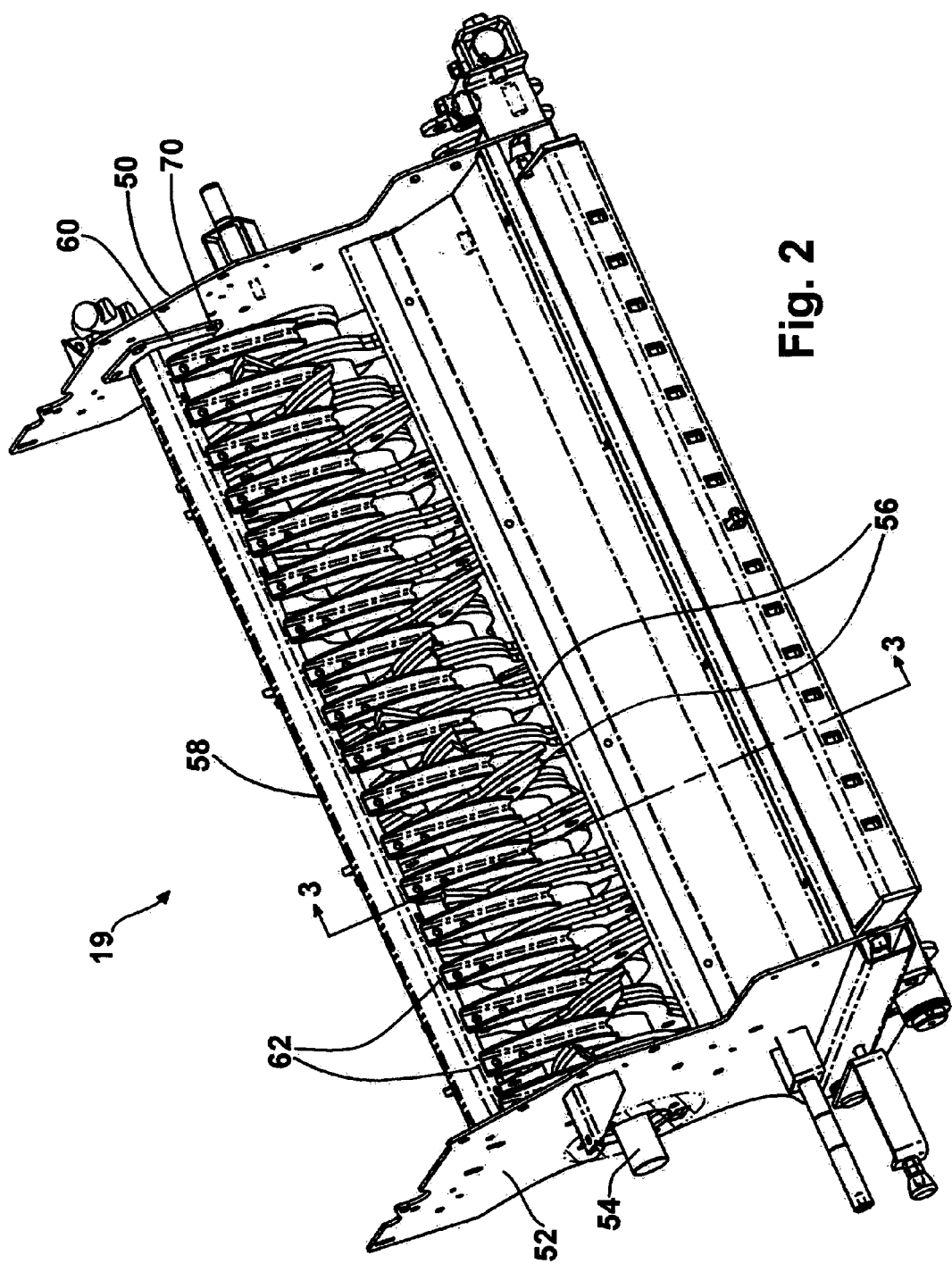
FIG. 2 is a partial perspective frontal top view of a rotor assembly incorporating the concepts of the instant invention and usable in the round baler of the type generally shown in FIG. 1.

FIG. 2 shows a rotor assembly, standing independently removed from a round baler. The assembly is comprised primarily of a rotor frame made up of a pair of generally identical spaced-apart side sheets 50, 52, each journaling an end of a rotor shaft 54 for rotation. Pivotably affixed to the rotor shaft 54 is a plurality of fingers 56 generally equally and spirally located along the length of the rotor shaft. Thus, between adjacent fingers the rotor has cylindrical surfaces 57 (see FIG. 3B) for contacting the crop material being transported. An elongate rigid stripper mount 58 extends between side sheets 50, 52, adjacent the path generated by the fingers 56 of the rotating rotor shaft 54. The stripper mount is affixed at its ends to a mounting plate 60 (only one shown) which is, as will be discussed further below, adjustably affixed to the side sheet 50.

Figure 3A:
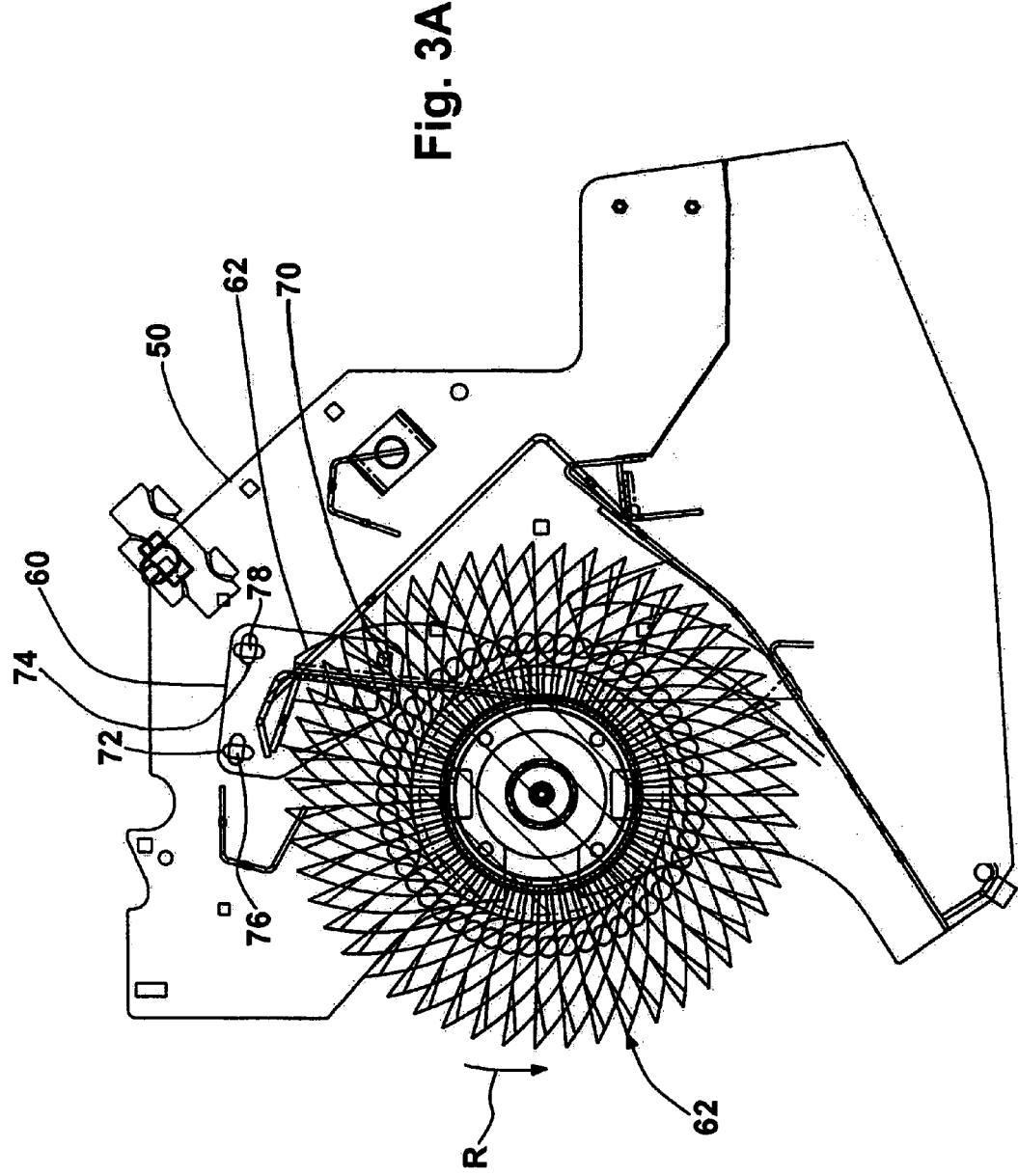
FIG. 3A is a cross-sectional view, taken along lines 3—3 of FIG. 2 primarily showing the stripper mount, the mounting plate, the rotors, and the relationships among them.

A plurality of stripper channels 62 are removably affixed at one end thereof to stripper mount 58 and positioned along the length of the stripper mount to fit between adjacent fingers 56. Thus, fingers 56 rotate with rotor shaft 54 in the direction R (FIG. 3A), moving in an arc through the openings between stripper channels 62, engaging the crop material and moving it along the virtual table-like structure made up of stripper channels 62 defined by the channels 62.

Figure 3B:
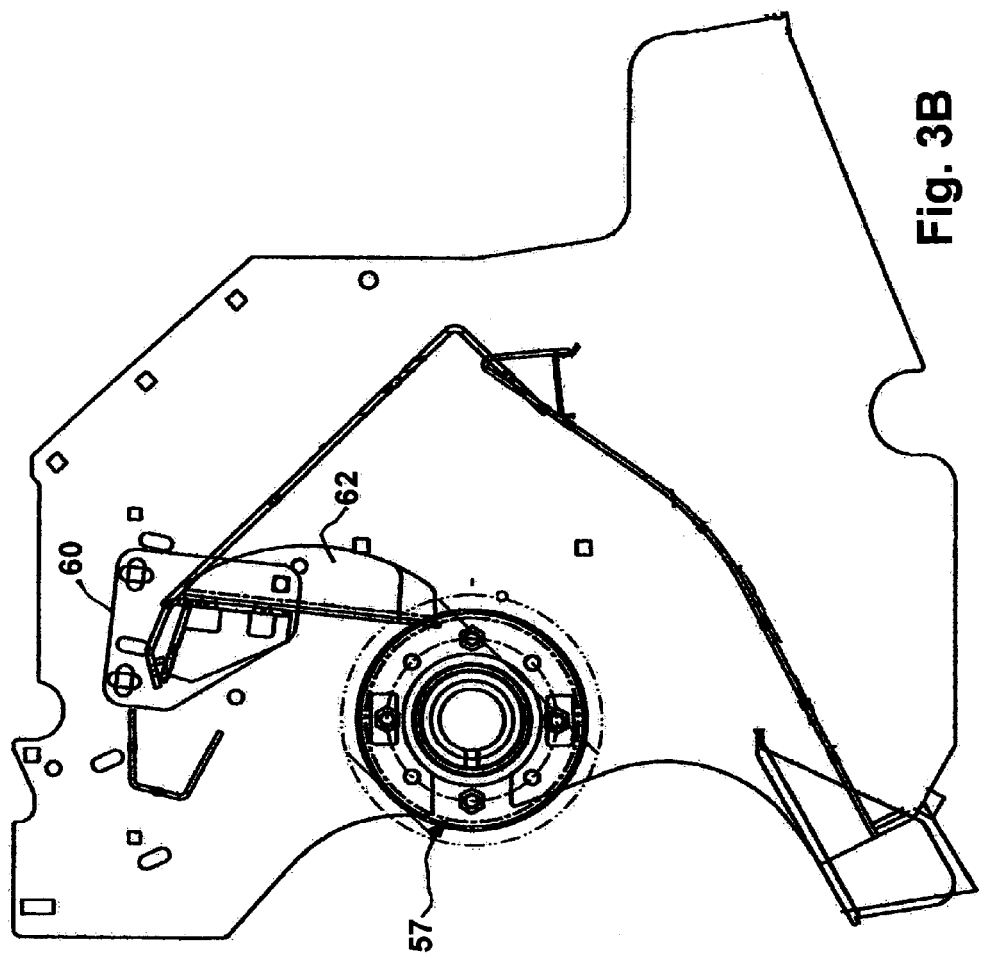
FIG. 3B is a simplified view of FIG. 3A depicting the minimum clearance position between the rotor and the stripper channels.
Figure 4A:
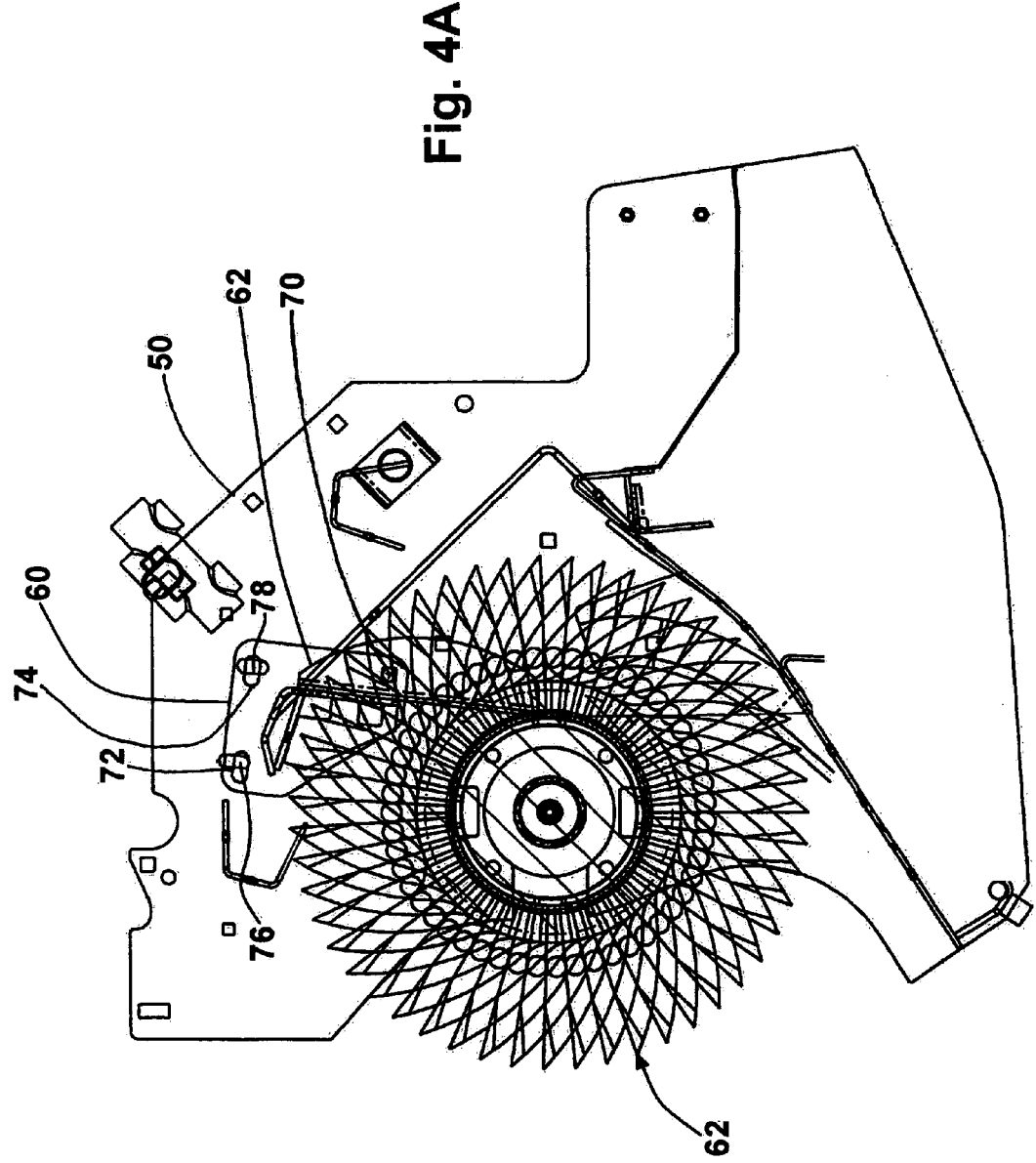
FIG. 4A, similar to FIG. 3, shows the mounting plate in a different position of adjustment.
Figure 4B:
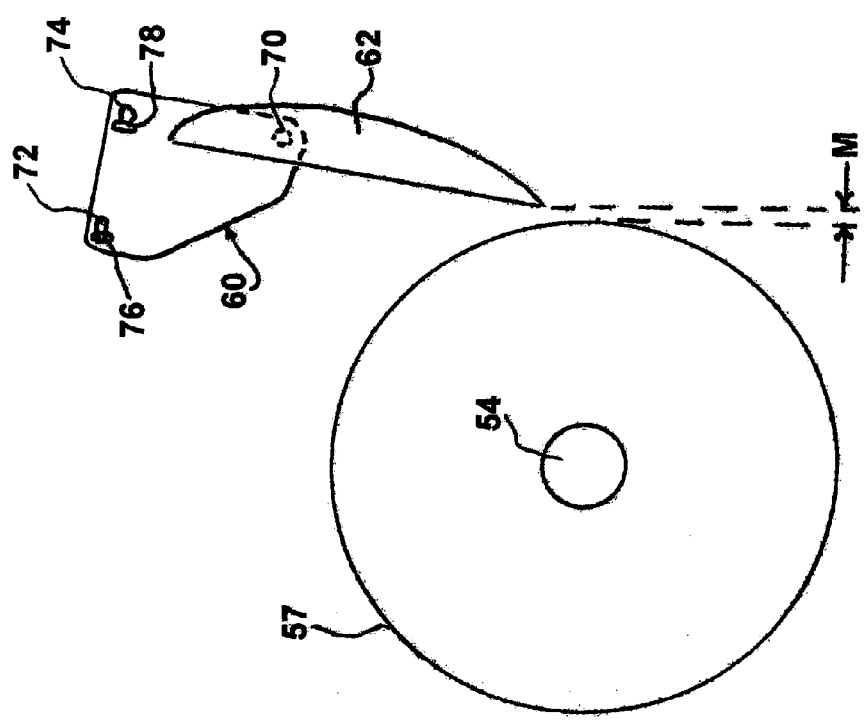
FIG. 4B is a simplified view of FIG. 4A depicting the maximum clearance between the rotor and the stripper channels.

The mounting plate 60 fits generally flat against the side sheet 50 and is affixed thereto, as at 70 so that plate 60 may be pivoted fore-and-aft about pivot point 70 in an arc. Plate 60 has two elongate slots therein 72, 74 through which carriage bolts 76, 78, respectively are inserted to allow movement of plate 60 and selectively locked into position by tightening of bolts 76, 78. Movement of plate 60 in fore-and-aft directions results in adjustment of stripper mount 58, and thus stripper channels 62, relative to the path of fingers 56 and the rotor surfaces 57. When the slots 72, 74 are in the forward most position, as shown in FIG. 3B, the stripper channels 62 are in the position of minimum clearance with rotor surfaces 57. When the slots 72, 74 are in the rearward most position, as shown in FIG. 4B, the stripper channels 62 are in the position of maximum clearance, M, with rotor surfaces 57. Obviously, with this structure the operator can adjust the stripping characteristics of the stripper channels/rotor surfaces interface to meet crop conditions.

The mechanism just described permits the operator or mechanic to adjust the relative positions of the components to avoid interference or undesirable misalignment, adjust the aggressiveness of the rotor fingers by controlling the amount of crop material that the fingers contact while rotating, and the stripping characteristics of the stripper channels with the rotor surfaces.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural round baler having a wheel-supported frame for movement across a field in a generally forward direction, a pickup mechanism, and an elongate rotor attached to said frame for moving crop material from the pickup mechanism into a bale-forming chamber, the improvement comprising:

first and second spaced-apart, generally parallel side sheets affixed to said frame; said elongate rotor having first and second opposing ends, said rotor mounted adjacent said first and second ends thereof on respective said first and second side sheets for rotation on an axis generally transverse to said forward direction;

a plurality of crop-engaging fingers mounted to said rotor in spaced-apart relationship along the length thereof and generating a plurality of rotational paths, thus defining a plurality of spaced-apart rotor surfaces along the length of said rotor between adjacent pairs or rotational paths;

an elongate stripper mount having first and second opposing ends, said stripper mount affixed at said first and second ends thereof, respectively, to said first and second side sheets such that said stripper mount extends transversely to said forward direction adjacent said rotor;

a plurality of stripper plates, each having a first end and an opposing second end, affixed at the first ends thereof to said stripper mount in spaced-apart generally parallel and transversely aligned relationship along the length of said stripper mount and positioned such that the second ends thereof extend between respective adjacent rotational paths crop-engaging fingers adjacent said respective spaced-apart rotor surfaces;

said stripper mount affixed at each end to said side sheets by generally identical mounting brackets, each said bracket comprised of a generally vertical adjustment plate having two elongated slots therethrough, each of said slots having a respective fixing bolt extending through said slot and said side sheet such that said adjustment plate may be selectively moved, via repositioning of said slots relative to said respective fixing bolt, to adjust said second ends of said stripper plates relative to said rotor surfaces, wherein each said adjustment plate is pivotably attached to said respective side sheet such that said respective slots are movable in an arc relative to said fixing bolt to promote ease of adjustment of said stripper plates relative to said rotor surfaces.

2. The improvement of claim 1, wherein:
said slots are of such a length to cause said second ends of said stripper plates to be adjustable between a first position where said second ends are closely adjacent said rotor surfaces, and a second position where said second ends are adjacent, but more remote than said first position, from said rotor surfaces.

3. The improvement of claim 1, wherein:
said slots are of such a length to cause said second ends of said stripper plates are adjustable between a first position where said second ends are closely adjacent said rotor surfaces, and a second position where said second ends are adjacent, but more remote than said first position, from said rotor surfaces.

4. A rotor assembly for moving crop between a pickup mechanism and a bale chamber of a round baler comprising:
first and second spaced-apart, generally parallel side sheets affixed to said frame;

an elongate rotor having first and second opposing ends, said rotor mounted adjacent said first and second ends thereof on respective said first and second side sheets for rotation on a first axis;

a plurality of crop-engaging fingers mounted to said rotor in spaced-apart relationship along the length thereof and generating a corresponding plurality rotational paths, thus defining a plurality of spaced-apart rotor surfaces along the length of said rotor between adjacent pairs of rotational paths;

an elongate stripper mount having first and second opposing ends, said stripper mount affixed at said first and second ends thereof, respectively, to said first and second side sheets such that said stripper mount extends on a second axis generally parallel to said first axis adjacent said rotor;

a plurality of stripper plates, each having a first end and an opposing second end, affixed at the first ends thereof to said stripper mount in spaced-apart generally parallel and transversely aligned relationship along the length of said stripper mount and positioned such that the second ends thereof extend between the rotational paths of respective adjacent crop-engaging fingers adjacent said respective spaced-apart rotor surfaces;

said stripper mount affixed at each end to said side sheets by generally identical mounting brackets, each said bracket comprised of a generally vertical adjustment plate having two elongated slots therethrough, each of said slots having a respective fixing bolt extending through said slot and said side sheet such that said adjustment plate may be selectively moved, via repositioning of said slots relative to said respective fixing bolt, to adjust said second ends of said stripper plates relative to said rotor surfaces, wherein each said adjustment plate is pivotably attached to said respective side sheet such that said respective slots are movable in an arc relative to said fixing bolt to promote ease of adjustment of said stripper plates relative to said rotor surfaces.

5. The rotor assembly of claim 4, wherein:
said slots are of such a length to cause said second ends of said stripper plates to be adjustable between a first position where said second ends are closely adjacent said rotor surfaces, and in a second position where said second ends are adjacent, but more remote than said first position, from said rotor surfaces.

6. The rotor assembly of claim 5, wherein:

said slots are of such a length to cause second ends of said stripper plates to be adjustable between a first position where said second ends are closely adjacent said rotor surfaces, and a second position where said second ends are adjacent, but more remote than said first position, from said rotor surfaces.

7. An agricultural round baler comprising:

a wheel-supported frame for movement across a field in a generally forward direction, a pickup mechanism, and an elongate rotor attached to said frame for moving crop material from the pickup mechanism into a bale-forming chamber;

first and second spaced-apart, generally parallel side sheets affixed to said frame; said elongate rotor having first and second opposing ends, said rotor mounted adjacent said first and second ends thereof on respective said first and second side sheets for rotation on an axis generally transverse to said forward direction;

a plurality of crop-engaging fingers mounted to said rotor in spaced-apart generally parallel and transversely aligned relationship along the length thereof and generating a plurality of rotational paths, thus defining a plurality of spaced-apart rotor surfaces along the length of said rotor between adjacent pairs of rotational paths;

an elongate stripper mount having first and second opposing ends, said stripper mount affixed at said first and second ends thereof, respectively, to said first and second side sheets such that said stripper mount extends transversely to said forward direction adjacent said rotor;

a plurality of stripper plates, each having a first end and an opposing second end, affixed at the first ends thereof to said stripper mount in spaced-apart relationship along the length of said stripper mount and positioned such that the second ends thereof extend between respective adjacent rotational paths crop-engaging fingers adjacent said respective spaced-apart rotor surfaces;

said stripper mount affixed at each end to said side sheets by generally identical mounting brackets, each said bracket comprised of a generally vertical adjustment plate having two elongated slots therethrough, each of said slots having a respective fixing bolt extending through said slot and said side sheet such that said adjustment plate may be selectively moved, via positioning of said slots relative to said respective fixing bolt, to adjust said second ends of said stripper plates relative to said rotor surfaces, wherein each said adjustment plate is pivotably attached to said respective side sheet such that said respective slots are movable in an arc relative to said fixing bolt to promote ease of adjustment of said stripper plates relative to said rotor surfaces.

8. The round baler of claim 7, wherein:

said slots are of such a length to cause said second ends of said stripper plates to be adjustable between a first position where said second ends are closely adjacent said rotor surfaces, arid a second position where said second ends are adjacent, but more remote than said first position, from said rotor surfaces.

9. The round baler of claim 7, wherein:

said slots are of such a length to cause second ends of said stripper plates to be adjustable between a first position where said second ends are closely adjacent said rotor surfaces, and a second position where said second ends are adjacent, but more remote than said first position, from said rotor surfaces.

* * * * *